United States Patent Office 3,642,799
Patented Feb. 15, 1972

3,642,799
SULPHONIUM NAPHTHALIMIDES
Georges Raymond Henry Mingasson, Paris, Annick Marthe Suzanne Simone Domergue, Eaubonne, and Robert Frederic Michel Sureau, Enghien les Baines, France, assignors to Ugine Kuhlmann, Paris, France
No Drawing. Filed July 29, 1969, Ser. No. 846,999
Claims priority, application France, Aug. 16, 1968, 161,965
Int. Cl. C07d 35/30
U.S. Cl. 260—270 R  10 Claims

ABSTRACT OF THE DISCLOSURE

This invention relates to new salts of sulphonium derivatives of naphthalimide. These salts have the general formula:

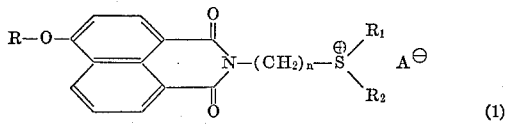

(1)

in which R and $R_1$ each represent the same or different lower alkyl radicals, preferably methyl or ethyl, $R_2$ represents a lower alkyl radical which may be substituted by a non-ionic and non-chromophoric substituent such as for example a lower alkoxy group, $n$ represents a whole number greater than 1, preferably 2 or 3, and $A^\ominus$ represents a monovalent anion.

The present invention relates to new salts of sulphonium derivatives of naphthalimide and corresponding to the general formula:

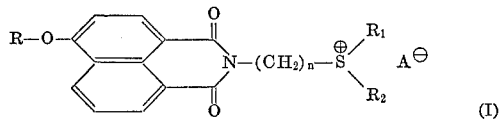

(I)

in which R and $R_1$ each represent the same or different lower alkyl radicals, preferably methyl or ethyl, $R_2$ represents a lower alkyl radical which may be substituted by a non-ionic and non-chromophoric substituent such as for example a lower alkoxy group, $n$ represents a whole number greater than 1, preferably 2 or 3, and $A^\ominus$ represents a monovalent anion.

"Lower" alkyl radicals and "lower" alkoxy radicals referred to throughout the specification are those containing from 1 to 4 carbon atoms.

The compounds of Formula I are very soluble in water, and their aqueous solutions show in daylight an intense greenish blue fluorescence. Their cationic character gives them, besides water-solubility, an excellent affinity for fibres based on polymers or copolymers of acrylonitrile, to which they impart a whitening effect of a particularly valuable brilliance, which is stable to light and to after-setting and resistant to washing and chemical bleaching agents such as sodium chlorite.

The optical brightening agents of Formula I may be prepared for example by the action of an alkylating agent of Formula A—$R_1$, for example an alkyl halide, sulphate, or sulphonate, on a compound of the general formula:

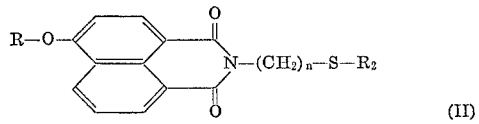

(II)

in which A, R, $R_1$, $R_2$ and $n$ have the same significance as in Formula I. This reaction may be carried out without a solvent or in the presence of an organic solvent such as for example aromatic hydrocarbons or their chlorinated derivatives, alcohols, chloroform or dimethyl formamide.

The compounds of Formula II are new products. They may be prepared for example by condensing 4-bromo naphthalic anhydride with an amine of the formula:

$$H_2N—(CH_2)_n—S—R_2 \quad (III)$$

in an aqueous medium or an organic solvent such as an alcohol or hydrocarbon, at a temperature from 75° C. to 200° C. and treating the new bromonaphthalimide thus obtained of formula:

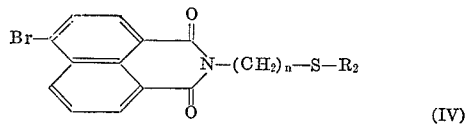

(IV)

with an alkali metal alcoholate in an excess of an anhydrous alcoholic medium at the boil or under pressure. In formulae (III) and (IV), the symbols $R_2$ and $n$ have the same significance as in Formula I.

The compounds of Formula II may also be obtained for example by condensing a 4-alkoxy-naphthalic anhydride with an amine of Formula III The invention is illustrated by, but not limited to, the following examples in which the parts are by weight unless the contrary is indicated. Examples 1 to 10 illustrate the preparation of the intermediate products of Formulae II and IV. Examples 11 to 15, 17 and 18 illustrate the preparation of sulphonium derivatives of naphthalimides according to the invention.

NAPHTHALIMIDES OF FORMULA IV

Example 1

A mixture of 56 parts of 4-bromo-naphthalic anhydride, 18.2 parts of β-aminoethylmethyl sulphide and 400 parts of ethyl alcohol is heated under reflux, with stirring, for 5 hours. Solution first takes place, then the bromonaphthalimide is reprecipitated. After cooling, the precipitate is filtered off, washed with ethyl alcohol and dried. 64 parts of 4-bromo-N-(2'-methyl-thio-ethyl)-naphthalimide melting at 128° C. are obtained.

On replacing the ethyl alcohol with the same amount of water, an identical product is obtained.

Example 2

The procedure is as in Example 1, but the β-aminoethylmethyl sulphide is replaced by 21 parts of γ-aminopropylmethyl sulphide. 30 parts of 4-bromo-N-(3'-methylthio-propyl)-naphthalimide melting at 105° C. are obtained.

Example 3

A mixture of 8.4 parts of 4-bromo-naphthalic anhydride, 5 parts of β-aminoethyl-β-ethoxyethylsulphide and 65 parts of ethanol is heated under reflux for 5 hours, with stirring. The product formed is filtered off after cooling and dissolved in 30 parts of boiling benzene. The solution is decolorised by the addition of carbon black and filtered. On addition of 30 parts of petrol ether, 9.3 parts of a white crystalline precipitate melting at 120° C. consisting of 4-bromo-N-[2'-(2''-ethoxy-ethylthio)-ethyl]-naphthalimide are formed.

When recrystallised from ethanol, this compound melts at 121–122° C. and its analysis gives the following results:

Calculated for $C_{18}H_{18}BrNO_3S$ (percent): C, 52.90; H, 4.42; N, 3.43; S, 7.84. Found (percent): C, 53.1; H, 4.94; N, 3.6; S, 7.76.

The β-aminoethyl β-ethoxyethyl sulphide used in this example was obtained in the following way; 10.6 parts of β-ethoxyethane-thiol are introduced into a cold solution of 8.8 parts of caustic soda in 60 parts by volume of absolute ethanol. 11.6 parts of β-chloroethylamine hydrochloride are added and the mixture is heated at 50–60° C. for 2 hours, then under reflux for 3 hours. The product is cooled to 0° C., filtered and the solid washed with alcohol. The alcoholic solution is evaporated and the residue is extracted with 40 parts by volume of benzene. The benzene is distilled and the mixture is rectified under vacuum. 11.2 parts of β-aminoethyl-β-ethoxyethyl sulphide are thus obtained. B.P. 18=115° C. Titre=96%.

NAPHTHALIMIDES OF FORMULA II

Example 4

7 parts of the bromonaphthalimide described in Example 1 are heated with 80 parts of methanol containing 2 parts of sodium at 105° C. for 3 hours in a sealed tube. After cooling, the crystalline product is filtered off, washed with a little methanol, then with water until neutral. After drying, 5 parts of 4-methoxy-N-(2'-methylthioethyl)-naphthalimide are obtained in the form of a clear yellow product melting at 127° C.

After recrystallising from ethanol, analysis gives the following results:

Calculated for $C_{16}H_{15}NO_3S$ (percent): C, 63.7; H, 4.98; N, 4.65; S, 10.63. Found (percent): C, 63.13; H, 5.01; N, 4.60; S, 10.71.

Example 5

On operating as in Example 4 from 7.2 parts of the bromonaphthalimide described in Example 2, 80 parts of methanol and 2 parts of sodium, 5.1 parts of 4-methoxy-N-(3'-methylthio-propyl)-naphthalimide melting at 93° C. are obtained.

After recrystallising from ethanol, analysis gives the following results:

Calculated for $C_{17}H_{17}NO_3S$ (percent): C, 64.7; H, 5.39; N, 4.4; S, 10.1. Found (percent): C, 64.05; H, 5.7; N, 4.51; S, 10.12.

Example 6

On operating as in Example 4 from 7 parts of the bromonaphthalimide described in Example 3, 125 parts of absolute methanol and 2 parts of sodium, an oily product is obtained which crystallises on cooling. After filtering, washing with water until neutral and drying in vacuo, 5.6 parts of 4-methoxy-N-[2'-(2''-ethoxy-ethylthio)-ethyl]-naphthalimide melting at 70° C. are obtained.

After recrystallising from methanol, the product melts at 76° C. and its analysis gives the following results:

Calculated for $C_{19}H_{21}O_4NS$ (percent): C, 63.50; H, 5.85; N, 3.90; S, 8.92. Found (percent): C, 63.8; H, 6.53; N, 3.50; S, 8.60.

Example 7

A mixture of 2.3 parts of 4-methoxy-naphthalic anhydride, 1 part of β-aminoethylmethyl sulphide and 40 parts of ethylene glycol are heated with stirring at 115° C. for 5 hours. The product is left to cool, the precipitate is filtered off, washed with alcohol then with water and dried. The product obtained melts at 127° C. It is identical with that of Example 4.

Example 8

On replacing the β-aminoethylmethyl sulphide in Example 7 by 1.1 parts of γ-aminopropylmethyl sulphide, the methoxynaphthalimide described in Example 5 is obtained.

Example 9

On replacing the methanol in Example 4 by an equal quantity of absolute ethanol, 5 parts of 4-ethoxy-N-(2'-methylthio-ethyl)-naphthalimide are obtained which, after recrystallising from ethanol, melts at 133° C.

Example 10

On proceeding as in Example 5, but replacing the methanol by ethanol, 4.4 parts of 4-ethoxy-N-(3'-methylthio-propyl)-naphthalimide are obtained which, after recrystallising from ethanol, melts at 122° C.

NAPHTHALIMIDES OF FORMULA I

Example 11

3 parts of 4-methoxy-N-(2'-methylthio-ethyl)-naphthalimide are mixed with 4 parts of methyl sulphate. The mixture is heated at 70° C. until a sample is soluble in water, which requires 30 to 45 minutes. The mass is dissolved in water, the solution is boiled with a little carbon black, filtered, and the cooled solution is precipitated by the addition of sodium chloride and zinc chloride. After filtering and drying, 5 parts of 4'-methoxy-2-naphthalimido ethyl dimethylsulphonium chlorozincate are obtained of the formula:

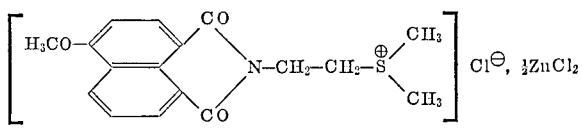

This product is soluble in water with an intense blue fluoroescence.

Example 12

On replacing in the preceding example the 4-methoxy-N-(2'-methylthio-ethyl)-naphthalimide by 4-methoxy-N-(3'-methylthio-propyl)-naphthalimide, 4'-methoxy-3-naphthalimido-propyldimethyl sulphonium chlorozincate is obtained in the same way.

Examples 13 and 14

On operating as in Example 11 from the 4-ethoxy-N-(2'-methylthio-ethyl)-naphthalimide described in Example 9 or from the 4-ethoxy-N-(3'-methylthio-propyl)-naphthalimide described in Example 10, 4' - ethoxy-2-naphthalimido-ethyl - dimethylsulphonium chlorozincate and 4' - ethoxy - 3 - naphthalimido-propyl-dimethyl sulphonium chlorozincate are obtained respectively.

Example 15

A mixture of 2 parts of 4-methoxy-N-[2'-(2''-ethoxy-ethylthio)-ethyl]-naphthalimide described in Example 6 and 2 parts of methyl sulphate is heated at 60° C. for one hour. At the end of about 45 minutes, the initial solution solidifies to a crystalline pulp. The mass is diluted with 10 parts of water, the solution obtained is boiled with 0.2 part of carbon black and filtered. 2 parts of sodium chloride are added to the cooled solution, then 10 parts by volume of a 10% solution of zinc chloride are added gradually with stirring. After filtering and drying, 3.2 parts of a pale yellow crystalline product are obtained. When recrystallised from anhydrous ethyl alcohol, its analysis gives the following results:

Calculated for $C_{20}H_{24}ClNO_4S$, ½ $ZnCl_2$, (percent): C, 50.25; H, 5.02; S, 6.70; N, 2.93. Found (percent): C, 49.7; H, 5.47; S, 7.17; N, 3.06.

Example 16

A treatment bath is prepared by dissolving 0.4 parts of one of the sulphonium salts described in Examples 11 to 15 in 3000 parts of water and 4 parts of acetic acid. 100 parts by volume of a 5% solution of sodium chlorite are added and 100 parts of a fabric based on polyacrylonitrile are introduced. The bath is heated to boiling in a period of 30 to 45 minutes and maintained at the boil for one hour. It is allowed to cool, the fabric is removed and rinsed with water. The fabric which was initially slightly yellow and dull, has a luminous white appearance, which is very fast to light, washing, steaming at 130° C. and chlorine.

Example 17

A mixture of 3 parts of 4-methoxy-N-(2'-methylthio-ethyl)-naphthalimide and 3 parts of ethyl sulphate is heated at 70–80° C. for one hour on a water bath. After cooling, the mass is diluted with 40 parts of water, a little carbon black is added, and it is brought to reflux and filtered. Sodium chloride is added to the cooled solution, then a dilute solution of zinc chloride. After filtering and drying, 4' - methoxy-2-naphthalimido-ethyl-ethyl-methyl-sulphonium chlorozincate is obtained.

On replacing the addition of sodium chloride and zinc chloride by an addition of potassium iodide, 4'-methoxy-2 - naphthalimido-ethyl-ethyl-methylsulphonium iodide is obtained.

Example 18

A mixture of 3 parts of 4-methoxy-N-(2'-methylthio-ethyl)-naphthalimide and 3 parts of methyl p-toluene-sulphonate is heated at 100° C. for 30 minutes. The solid product obtained on cooling is washed with a little chloroform and dried. 1.6 parts of 4'-methoxy-2-naphthalimido-ethyl-dimethylsulphonium p-toluene-sulphonate in the form of a clear yellow powder which is completely soluble in water are thus obtained.

The sulphonium salts described in Examples 17 and 18 may be applied to fibres based on polymers or copolymers of acrylonitrile by the process described in Examples 16 with analogous results.

We claim:
1. A water-soluble optical brightening agent of the formula:

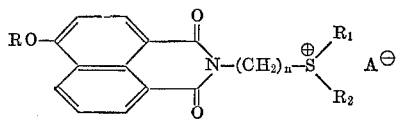

in which R and $R_1$ each are the same or different lower alkyl groups, $R_2$ is a lower alkyl or lower alkoxyalkyl group, $n$ is 2 or 3 and $A^\ominus$ is a colourless monovalent anion.

2. Agent according to claim 1 wherein R represents methyl or ethyl.
3. Agent according to claim 1 wherein $R_1$ represents methyl or ethyl.
4. Agent according to claim 1 wherein $n$ represents 2 or 3.
5. The 2 - (4' - methoxy-naphthalimido)ethyl dimethyl sulphonium chlorozincate.
6. The 2 - (4' - methoxy-naphthalimido)ethyl dimethyl sulphonium sulphomethylate.
7. The 3 - (4' - methoxy-naphthalimido)propyl dimethyl sulphonium chlorozincate.
8. The 3 - (4' - methoxy-naphthalimido)propyl dimethyl sulphonium sulphomethylate.
9. The 2 - (4' - ethoxy-naphthalimido)ethyl dimethyl sulphonium chlorozincate.
10. A process for the preparation of an optical brightening agent in which a compound of the formula:

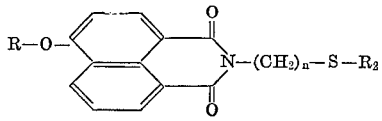

in which R is a lower alkyl group, $n$ is 2 or 3, and $R_2$ is a lower alkyl or lower alkoxyalkyl group is reacted with a lower alkyl halide, sulphate or sulphonate.

References Cited
UNITED STATES PATENTS

| | | | |
|---|---|---|---|
| 3,308,127 | 3/1967 | Senshu | 260—281 |
| 3,310,564 | 3/1967 | Kasai | 260—281 |
| 3,330,834 | 7/1967 | Senshu et al. | 260—281 |

DONALD G. DAUS, Primary Examiner

U.S. Cl. X.R.

8—55; 260—281, 583 EE

UNITED STATES PATENT OFFICE
CERTIFICATE OF CORRECTION

Patent No. 3,642,799  Dated February 15, 1972

Inventor(s) G.R.H. Mingasson, A.M.S.S. Domergue and R.F.M. Sureau

It is certified that error appears in the above-identified patent and that said Letters Patent are hereby corrected as shown below:

In the heading, column 1, lines 5 and 6 should read:

Claims priority, application France, Aug. 6, 1968, 161,965

Signed and sealed this 13th day of June 1972.

(SEAL)
Attest:

EDWARD M. FLETCHER, JR.
Attesting Officer

ROBERT GOTTSCHALK
Commissioner of Patents